United States Patent [19]

Fauchet et al.

[11] Patent Number: 4,759,237
[45] Date of Patent: Jul. 26, 1988

[54] SELF-LOCKING NUT AND TIGHTENING TOOL

[76] Inventors: Christian R. Fauchet, 5, rue des Fonds de Cuves, 95240 Cormeilles en Parisis; Reynald Rousselle, 31, rue Benoit Frachon, 78280 Guyancourt, both of France

[21] Appl. No.: 943,926

[22] Filed: Dec. 18, 1986

[51] Int. Cl.⁴ .............................................. B25B 13/50
[52] U.S. Cl. .................................. 81/53.2; 411/3; 411/5; 411/277; 411/281; 411/427; 411/937; 72/75; 29/517; 29/437; 81/128
[58] Field of Search .................. 411/2, 3, 5, 8, 281, 411/282, 277, 278, 283, 284, 427, 937, 276, 298; 81/177.85, 53.2, 128; 72/75; 29/517, 437

[56] References Cited

U.S. PATENT DOCUMENTS

| | | | |
|---|---|---|---|
| 2,125,276 | 8/1938 | Green | 411/282 |
| 2,743,639 | 5/1956 | Lynch | 81/128 |
| 3,311,147 | 3/1967 | Walker | 411/278 X |
| 4,408,936 | 10/1983 | Williamson | 411/281 X |
| 4,513,643 | 4/1985 | McKean | 81/53.2 |
| 4,539,872 | 9/1985 | Bochman, Jr. | 81/53.2 |
| 4,544,312 | 10/1985 | Stencel | 411/3 |
| 4,682,520 | 7/1987 | Gray | 411/8 X |

FOREIGN PATENT DOCUMENTS

| | | | |
|---|---|---|---|
| 844371 | 6/1970 | Canada | 411/3 |
| 192203 | 8/1986 | European Pat. Off. | 411/403 |
| 1366609 | 6/1964 | France | 411/281 |

Primary Examiner—Lloyd A. Gall
Assistant Examiner—Curtis B. Brueske
Attorney, Agent, or Firm—Schiller, Pandiscio & Kusmer

[57] ABSTRACT

A self-locking nut is provided having, at its periphery, a number of longitudinal channels (3) with semi-circular section intended to cooperate with drive balls carried by an appropriate tightening tool, said balls causing, at the end of tightening, the formation of a circular groove (10) by forcing back the metal situated between the channels (3), which results in radial deformation of the inner threads of the nut (1) at the level of said groove (10).

7 Claims, 1 Drawing Sheet

SELF-LOCKING NUT AND TIGHTENING TOOL

FIELD OF THE INVENTION

The present invention relates to a self-locking nut, namely a nut offering a resistant torque to unscrewing.

BACKGROUND OF THE INVENTION

It is known that the mechanical strength of assemblies is considerably improved by the effect of a pre-load as high as possible introduced by tensioning the fixing elements, very often formed by threaded elements. In this case, tensioning of the screw is provided by the screwing torque, which may be obtained by means of a spanner or of a tightening tool of dynamometric type. However, this solution requires regular calibration of the equipment and this is why it is now preferred to use fixing systems themselves producing the desired screwing torque. Thus, systems are known in which the nut includes a driving part which is designed so as to break when a predetermined screwing torque is reached. Such systems are relatively expensive.

Moreover, the unscrewability of threaded systems is generally provided by permanent deformation of the nut which produces a resistive torque by friction on the screw. Now, when a high and given pre-load is desired in the assembly, this resistant torque is opposed to the screwing torque and therefore introduces a dispersion factor prejudicial to the effective tensioning of the screw.

SUMMARY OF THE INVENTION

The main purpose of the present invention is to overcome these drawbacks and, for this, it provides a self-locking nut which is essentially characterized in that it includes, at its periphery, a number of longitudinal channels with semi-circular section for cooperating with drive balls carried by an appropriate tightening tool, said balls causing, at the end of tightening, the formation of a semi-circular groove by forcing back the metal situated between the channels, which causes radial deformation of the inner thread of the nut at the level of said groove.

Thus, the initial fitting of the nut on the screw takes place freely, i.e. without any resistant torque, and therefore does not influence the final tightening torque. In addition, different given tightening torques may be obtained with the same nut, depending on whether all or part of the channels are driven by an equal or smaller number of balls of the tightening tool. Finally, the unscrewability of the nut is obtained automatically at the end of tightening during formation of the circular groove.

According to another feature of the invention, the nut has an external tapered shape, the depth of the channels increasing towards the base of the nut which is provided on the opposite side with an inner recess whose diameter is substantially greater than that of the crest of the threads of the associated screw.

Preferably also the nut has a tapered section at the level of the channels.

Thus, several successive tightening operations may be carried out with increasing torques, which is particularly advantageous in the case of assemblies likely to undergo appreciable relaxation after the first fitting, for example when it is a question of plastic material or metal sheets with interpositioning of products. One of more tightening operations are first of all carried out at the level of the recess, which causes no locking of the nut, whereas the last tightening operation is carried out beyond the recess, thus ensuring the unlockability of the system.

BRIEF DESCRIPTION OF THE DRAWINGS

Several embodiments of the invention are described hereafter by way of example, with reference to the accompanying drawings in which.

Figure 1:
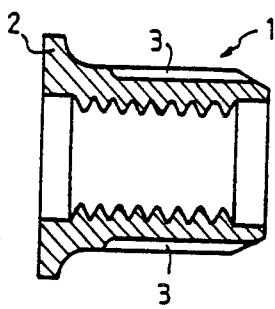
FIG. 1 is an axial sectional view of a self-locking nut of the invention.
Figure 2:
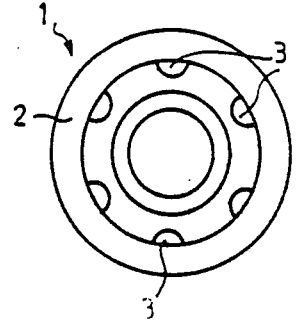
FIG. 2 is an end view of this nut.

Nut 1 shown in FIGS. 1 and 2 is provided with a base 2 and has at its periphery a number of longitudinal channels 3 which are here six in number. These channels are disposed along generatrices spaced evenly apart on the surface of the nut and have a semi-circular section.

Figure 3:
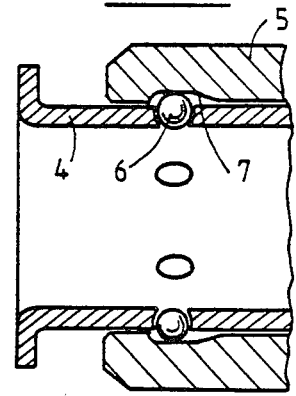
FIG. 3 is an axial sectional view of the corresponding tightening tool in the inactive position.
Figure 4:
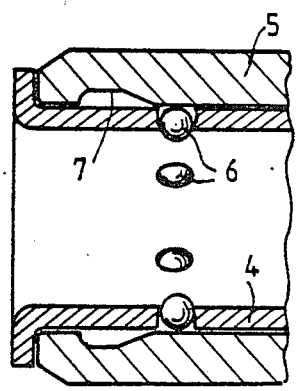
FIG. 4 is an axial sectional view of the same tightening tool in the active position.

The corresponding tightening tool, shown in figures 3 and 4, is formed essentially of a telescopic barrel 4 sliding in a sleeve 5. In the barrel 4 are disposed a number of balls 6 which may retract into a disengagement groove 7 of the sleeve when the tool is in its rest position, as shown in FIG. 3. Under the effect of an axial force exerted on the tool, the telescopic barrel 4 is driven into sleeve 5 and causes the radial movement of balls 6, as shown in FIG. 4. Said balls may then engage in the channels 3 of nut 1.

DETAILED DESCRIPTION OF THE DRAWINGS

Figure 5:
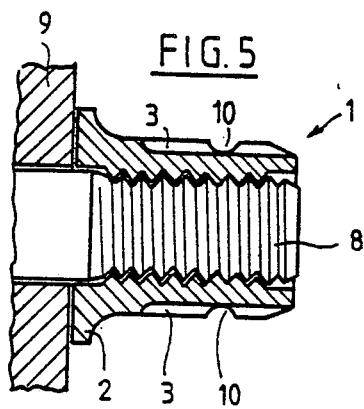
FIG. 5 is an axial sectional view of the nut at the end of tightening on a screw.

Rotation of the tool thus causes the free screwing of nut 1 on a screw such as 8, until its base 2 comes into contact with the part to be assembled 9, as illustrated in FIG. 5. Under the action of a sufficient torque, balls 6 then cause the plastic deformation of the metal forming the nut and create at its surface a circular groove 10. Simultaneously, the movement of the metal induces local deformation of the inner thread of the nut at the level of groove 10, which results in efficient locking on the corresponding thread of screw 8, thus making the system unlockable without the action of a contrary much higher torque.

By releasing the axial force exerted on the tightening tool, sleeve 5 moves back with respect to barrel 4 and balls 6 may retract into the grooves 7 provided for this purpose, which allows the tool to be easily released from the nut.

The final tightening torque is directly related to the torque required for causing the beginning of plastic deformation of the material of the nut. It is conditioned by:

the nature and characteristics of mechanical strength of the material forming the nut, The volume of metal resisting the pressure of the balls, depending on the shape and relative dimensions of the balls and of the channels, as well as on the relative number of balls and channels in contact.

Thus, the same nut having a given number of channels may be mounted with different torques depending on whether all of part of the channels are driven by an equal or smaller number of balls in the tightening tool.

It will be further noted that the nut of the invention provides ready self checking of the assembly after mounting. In fact, the sight of a circular and uniform groove 10 on the nut is the guarantee that a correct torque has been applied and that the system has become unreleasable by self-locking.

Figure 6:
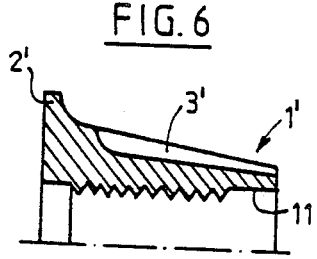
FIG. 6 is an axial sectional view of a variant of construction of the nut of the invention.
Figure 7:
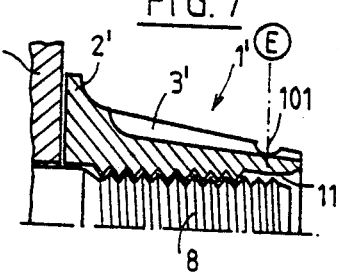
FIG. 7 is an axial sectional view of this nut after a first tightening on a screw.
Figure 8:
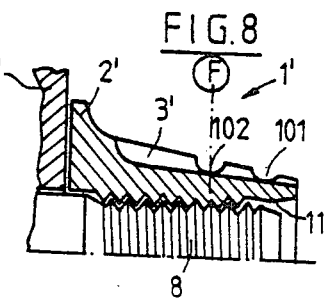
FIG. 8 is an axial sectional view of the nut after a second tightening operation.

In the variant of construction shown in FIGS. 6 to 8, the nut has an external tapered shape and also a tapered section at the level of channels 3', the depth of these channels increasing the closer to base 2'. In addition, the nut is provided on the side opposite base 2' with a deep recess 11 whose diameter is substantially greater than that of the crest of the threads of the associated screw 8.

The corresponding tightening tools, not shown here, have a tapered inlet adapted to the shape of the nut and are characterized by a more or less deep position of the balls with respect to the front face of the tool.

Tightening is further effected using a tool whose balls are situated in a plane E, as shown in FIG. 7, the plastic deformation of the nut occurring under a torque $C_1$. The circular groove 101 formed by the balls is then at the level of recess 11 of the nut, so that there is no locking thereof on the crest of the threads of screw 8.

After relaxation of the assembly (for example, flow and polymerization of an interposition product, flow of plastic material or of a composite material etc. . . ) a second tightening operation is effected using a tool whose balls are situated in a plane F, as shown in FIG. 8. Because the channel 3' has at F a depth greater than that at E, which results in a greater volume of metal to be deformed and because the diameter at the bottom of the channel is greater at F, with respect to E, the torque $C_2$ at which the plastic deformation of the metal takes place is greater than the torque $C_1$ of the first tightening operation, thus allowing efficient retightening of the assembly. Moreover, at position F, the circular groove 102 formed by the balls under the action of torque $C_2$ induces a radial deformation of the metal of the nut which is located at the level of the inner threads of the nut and the outer threads of the screw, thus causing efficient locking of one with respect to the other.

Figure 9:
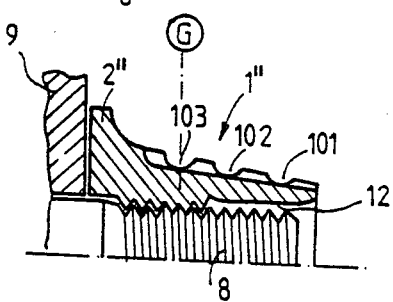
FIG. 9 is an axial sectional view of a variant of construction of the nut of the invention, allowing three successive tightening operations.

In the variant of construction shown in FIG. 9, nut 1' is similar to that shown in FIGS. 6 to 8, but includes an even deeper recess 12. Thus, two successive tightening operations may be carried out in planes E and F, without there being any self-locking A third and last tightening may then be carried out in a plane G at a torque $C_3$ greater than $C_2$ with formation of a circular groove 103 which causes final self-locking of the nut by radial deformation of its inner thread.

The self-checking of such nuts after assembly is characterized by the number and position of circular grooves such as 101, 102 and 103 caused by the successive tightening operations.

What is claimed is:

1. A self-locking nut to be secured to a screw tih a tightening tool, the tightening tool being of the type including a barrel having a wall, a plurality of drive balls positioned in said wall of said barrel, and a sleeve surrounding an exterior section of said barrel and axially movable relative to said barrel between a first rest position and a second position in response to a predetermined axial force exerted on said tightening tool, said sleeve having a groove in its inner wall for receiving said plurality of drive balls when said sleeve is in said first position and causing said drive balls to extend axially inward when said sleeve is moved to said second position, said self-locking nut comprising:
   an internally threaded bore;
   a plurality of longitudinal channels located on the outer surface of said self-locking nut, said longitudinal channels having a predetermined cross-section for receiving said drive balls;
   wherein said nut undergoes plastic deformation when said tool is positioned on said nut so that said drive balls are positioned in corresponding grooves, said sleeve is moved to said second position and said tool is rotated relative to said nut so as to create a circular groove in the outer surface of said nut and a local circular radial deformation in the inner radial bore.

2. The self-locking nut of claim 1, further comprising:
   a base at one end of said nut; and
   an external tapered shape increasing in size toward said base;
   wherein said longitudinal channels increase in depth toward said base; and said internally threaded bore has a section at the end opposite said base, said section having an internal diameter substantially greater than that of the crest of the threads of said screw.

3. The self-locking nut of claim 2, wherein said longitudinal channels are located in said tapered section.

4. In combination, a self-locking nut and a tightening tool for fastening said self-locking nut to a screw:
   said self-locking nut comprising an internally threaded bore and a plurality of longitudinal channels of a predetermined cross-section and located on the outer surface of said self-locking nut; and
   said tightening tool comprising (a) a barrel having a side wall, (b) a plurality of drive balls positioned in said side wall, wherein said plurality of drive balls are positioned to engage in corresponding ones of said longitudinal channels; and (c) a sleeve surrounding an exterior section of said barrel and adapted to move axially relative to said barrel from a first rest position to a second position in response to a predetermined axial force exerted on said sleeve relative to said barrel, said sleeve having a groove in its inner wall for receiving said plurality of drive balls when said tool is positioned on said nut and said sleeve is in said first position such that said sleeve (a) causes said drive balls to extend radially inward when said sleeve is moved to said second position causing said self-locking nut to undergo plastic deformation and (b) creates a circular groove in the outer surface of said nut and a local circular radial deformation of said internally threaded bore as said tightening tool is rotated relative to said self-locking nut.

5. The combination of claim 4 wherein said self-locking nut further comprises:
   a base at the end of said nut; and
   an external tapered shape increasing in size toward the base;

wherein said longitudinal channels increase in depth toward said base of said self-locking nut; and said internally threaded bore has a section at the end opposite said base, said section having an internal diameter substantially greater than that of the crest of the threads of said screw.

6. The combination of claim 5 wherein said longitudinal channels are located in the tapered section of said self-locking nut.

7. The self-locking nut of claim 1 wherein said longitudinal channels are spaced evenly apart.

* * * * *

UNITED STATES PATENT AND TRADEMARK OFFICE
CERTIFICATE OF CORRECTION

PATENT NO. : 4,759,237

DATED : July 26, 1988

INVENTOR(S) : Christian R. Fauchet & Reynald Rousselle

It is certified that error appears in the above-identified patent and that said Letters Patent is hereby corrected as shown below:

Claim 1, column 3, line 66, delete "tih" and substitute therefor -- with--;

On the title page after inventors names, please add -- Establissements SAINT-CHAMOND-GRANAT -- as the Assignee.

Signed and Sealed this

Twentieth Day of December, 1988

Attest:

DONALD J. QUIGG

Attesting Officer

Commissioner of Patents and Trademarks